T. V. MARLING.
FRONT WHEEL DRIVE MECHANISM.
APPLICATION FILED JAN. 19, 1918.

1,289,851.

Patented Dec. 31, 1918.

WITNESSES

INVENTOR
Thos. V. Marling
BY Victor J. Evans
ATTORNEY

UNITED STATES PATENT OFFICE.

THOMAS V. MARLING, OF SAN DIEGO, CALIFORNIA.

FRONT-WHEEL DRIVE MECHANISM.

1,289,851. Specification of Letters Patent. Patented Dec. 31, 1918.

Application filed January 19, 1918. Serial No. 212,704.

*To all whom it may concern:*

Be it known that I, THOMAS V. MARLING, a citizen of the United States, residing at San Diego, in the county of San Diego and State of California, have invented new and useful Improvements in Front-Wheel Drive Mechanism, of which the following is a specification.

This invention relates to front wheel drive mechanism, the broad object in view being to provide simple mechanism for transmitting the power of the engine of a motor vehicle to the front wheels thereof without interfering in any way with the steering movement of said front wheels.

A further object of the invention is to provide front wheel driving mechanism used in conjunction with the rear wheel driving mechanism enabling power to be transmitted to all four of the carrying wheels of the machine which thereby become driving wheels, obtaining greater efficiency, greater safety against skidding, economizing power and eliminating a portion of the wear on the working parts and tires of the rear wheels, and distributing such wear and tear to all of the wheels of the vehicle.

With the above and other objects in view, the invention consists in the novel construction, combination and arrangement of parts, herein fully described, illustrated and claimed.

In the accompanying drawings:—

Figure 1:
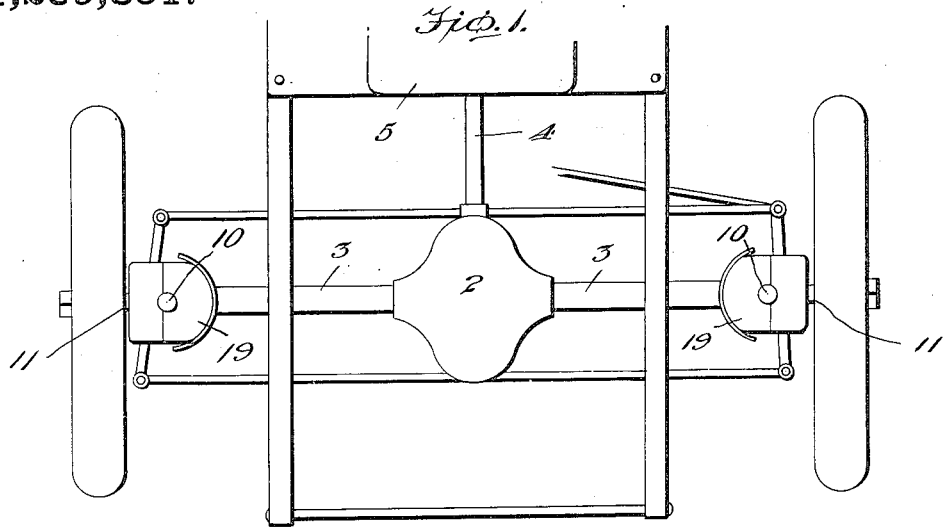
Figure 1 is a plan view of a sufficient part of a motor vehicle chassis to illustrate the present invention in its applied relation thereto.

Referring to the drawings 1 designates one of the sections of a divided front axle, constructed after the manner of the present day rear axle, the sections of the front axle 1 being controlled by centrally arranged differential gearing 2 corresponding with the present day rear differential gearing. The sections 1 of the front axle like the sections of the present day rear axle are mounted in a front axle housing 3. The driving shaft 4 from the engine 5 is geared to the front differential gearing 2 so as to transmit motion to both of the axle sections 1.

In carrying out the present invention, on the outer end of each of the axle sections 1, I fasten an axle gear 6. Beyond the gear 6 the axle 1 is reduced as shown at 7 and journaled in a bearing member 8 forming a pivotal part of the steering knuckle through which the vertically disposed pivot pin 9 is inserted, said pin being provided at its upper end with a head 10.

The front axle spindle 11 has fast on the inner end thereof a spindle gear 12 and beyond the gear 12, the inner extremity of the spindle 11 is reduced as shown at 13 and inserted in the socket 14 in a gearing 15 also forming a pivotal part of the steering knuckle. Interposed between the gears 6 and 12 is a double crown gear 16 embodying an upwardly disposed gear face 17 which meshes with the spindle gear 12 and a downwardly disposed gear face 18 which meshes with the axle gear 6. A knuckle housing 19 embraces all of the gears 6, 12 and 16 as clearly shown in Fig. 2 and is formed with top and bottom openings to receive the pivot pin 9. The gear 6 at its outer side has a bearing shoulder 20 which bears against the inner face of the housing, and likewise the gear 12 is provided at its outer side with a shoulder 21 which also bears against the inner surface of the knuckle housing 19 as shown. The purpose of the shoulders 20 and 21 is to maintain an accurate mesh between the gears 6 and 12 and the double crown gear 16.

The housing 19 is formed with an opening 22 for the spindle 11. At its inner side the knuckle housing 19 is formed with an arcuate slot 23 in which is slidable an arcuate plate 24 formed with a hole 25 for the adjacent axle section 1. The plate 24 acts as a dirt guard and serves to exclude foreign matter as well as retain lubricating material within the knuckle housing 19. Where the plate 24 fits the housing 19, the latter is rabbeted as shown at 26 which further serves to exclude foreign matter and retain lubricating material.

Figure 2:
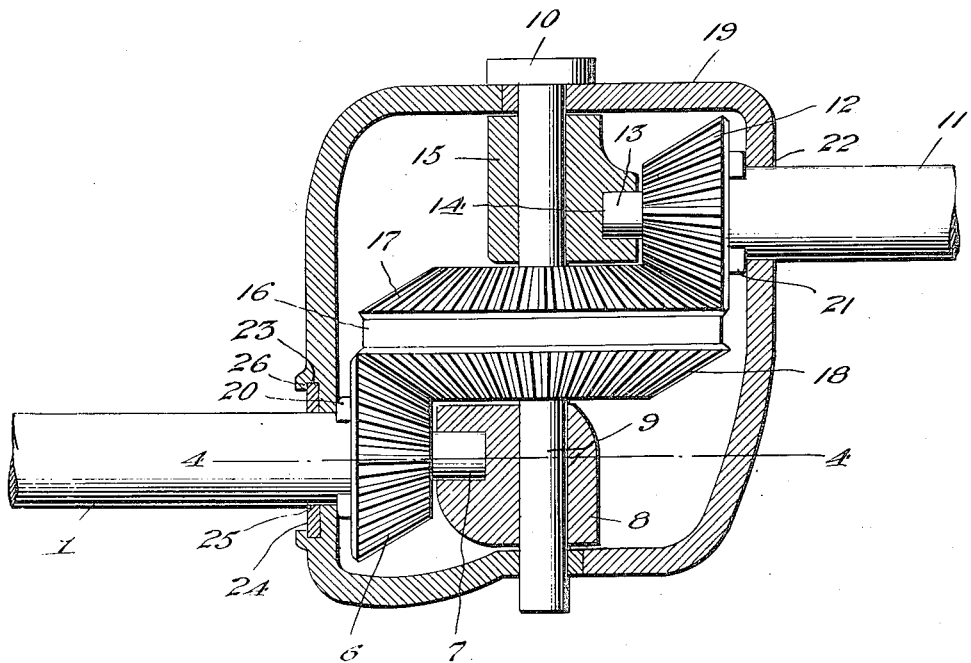
Fig. 2 is an enlarged fragmentary vertical section taken about in line with the front axle and the pivot pin of one of the steering knuckles.

Under the arrangement and construction hereinabove described, the axle 1 may set low or what is known in the art as underslung, the front wheel spindles 11 being located at a higher elevation than the axle sections 1 as shown in Fig. 2.

From the foregoing description taken in connection with the accompanying drawings it will now be seen that the power of the engine is transmitted to the front wheels of the vehicle without interfering with the steering movement of said front wheels and without interfering with the transmission of a proportion of the power of the engine to the rear wheels in accordance with the present day automobile practice. By driving the front wheels, the power is distributed to all four of the carrying wheels of the machine, greater efficiency is obtained and greater safety by reason of the tendency of the machine to skid when all of the power is applied to the rear wheels and none to the front wheels; furthermore the wear and tear upon the rear wheels and tires and the rear wheel driving mechanism is considerably lessened, a portion of such wear and tear being borne by the front steering wheels and the driving connections therefor.

I claim:—

In motor vehicle driving mechanism, the combination of a front axle, an axle gear fast on each outer end thereof, wheel spindles, a spindle gear fast on the inner end of each spindle, a crown gear interposed between the aforesaid gears and meshing therewith, a knuckle housing inclosing said axle gear, spindle gear and crown gear, and carried by the axle spindle, a substantially vertical knuckle pin inserted through the top and bottom of said housing and through said crown gear, the latter being loose on said pivot pin, and upper and lower bearing members journaled on said pin between the crown gear and the top and bottom walls of the housing, the inner ends of the adjacent front axle sections and spindles being reduced and journaled in said bearing members.

In testimony whereof I affix my signature.

THOMAS V. MARLING.